United States Patent
Wada et al.

(10) Patent No.: US 7,053,926 B2
(45) Date of Patent: May 30, 2006

(54) ELECTRONIC ENDOSCOPE APPARATUS ENLARGING A STILL IMAGE

(75) Inventors: Yuji Wada, Saitama (JP); Kazuhiro Yamanaka, Saitama (JP); Mitsuru Higuchi, Saitama (JP)

(73) Assignee: Fujinon Corporation, Saitama (JP)

( * ) Notice: Subject to any disclaimer, the term of this patent is extended or adjusted under 35 U.S.C. 154(b) by 619 days.

(21) Appl. No.: 09/953,175

(22) Filed: Sep. 17, 2001

(65) Prior Publication Data

US 2002/0033882 A1    Mar. 21, 2002

(30) Foreign Application Priority Data

Sep. 19, 2000  (JP) .............................. 2000-283072
Mar. 5, 2001  (JP) .............................. 2001-059780

(51) Int. Cl.
*H04N 7/18* (2006.01)
(52) U.S. Cl. ............................ 348/65; 348/74; 348/76; 348/77; 600/109; 600/160; 600/114
(58) Field of Classification Search ............... 348/65, 348/74, 76, 77; 600/109, 160, 114
See application file for complete search history.

(56) References Cited

U.S. PATENT DOCUMENTS

| | | | | | |
|---|---|---|---|---|---|
| 5,243,967 | A | * | 9/1993 | Hibino | 600/109 |
| 5,269,289 | A | * | 12/1993 | Takehana et al. | 600/109 |
| 5,740,267 | A | * | 4/1998 | Echerer et al. | 382/132 |
| 6,120,435 | A | * | 9/2000 | Eino | 600/118 |

* cited by examiner

*Primary Examiner*—Shawn S. An
(74) *Attorney, Agent, or Firm*—Snider & Associates; Ronald R. Snider

(57) ABSTRACT

When a first-stage operation or first operation of a freeze switch is performed, a still image is stored in image memory and is displayed on a monitor. When an electronic variable power switch is operated in this state, a still image electronically enlarged is formed on the basis of a signal of the above-described image memory. Then, when a second-stage operation or second operation of the freeze switch is performed, the above-described enlarged still image is recorded in a recording device. Owing to this, it is possible to display and record an arbitrary still image that is enlarged and is positioned on optimum conditions. Moreover, by single operation of an electronic variable power switch, an enlarged still image can be formed and can be also recorded simultaneously. Furthermore, even if continuous recording operation is prohibited, the next recording operation can be performed by operating the electronic variable power switch.

4 Claims, 8 Drawing Sheets

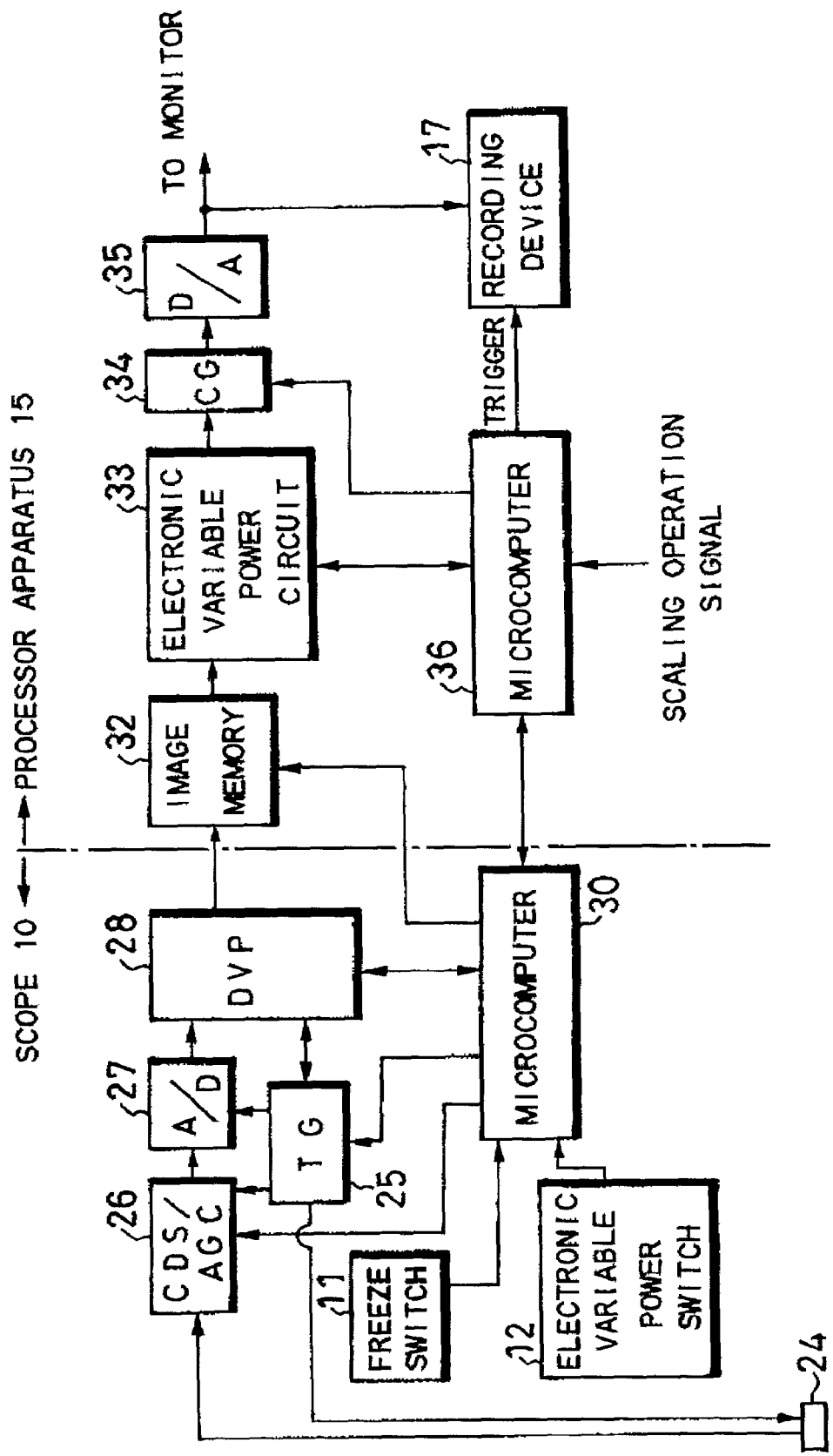

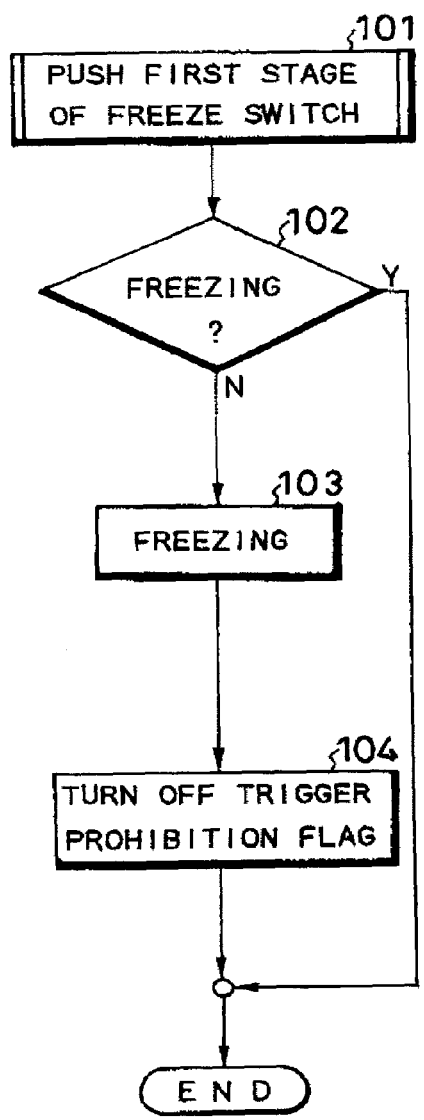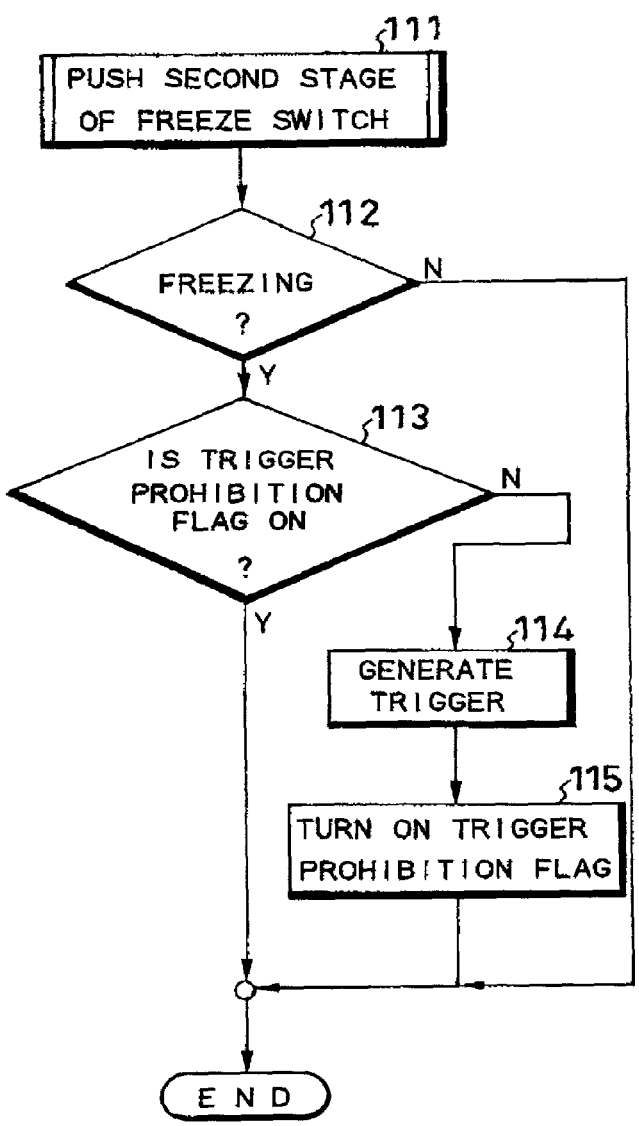

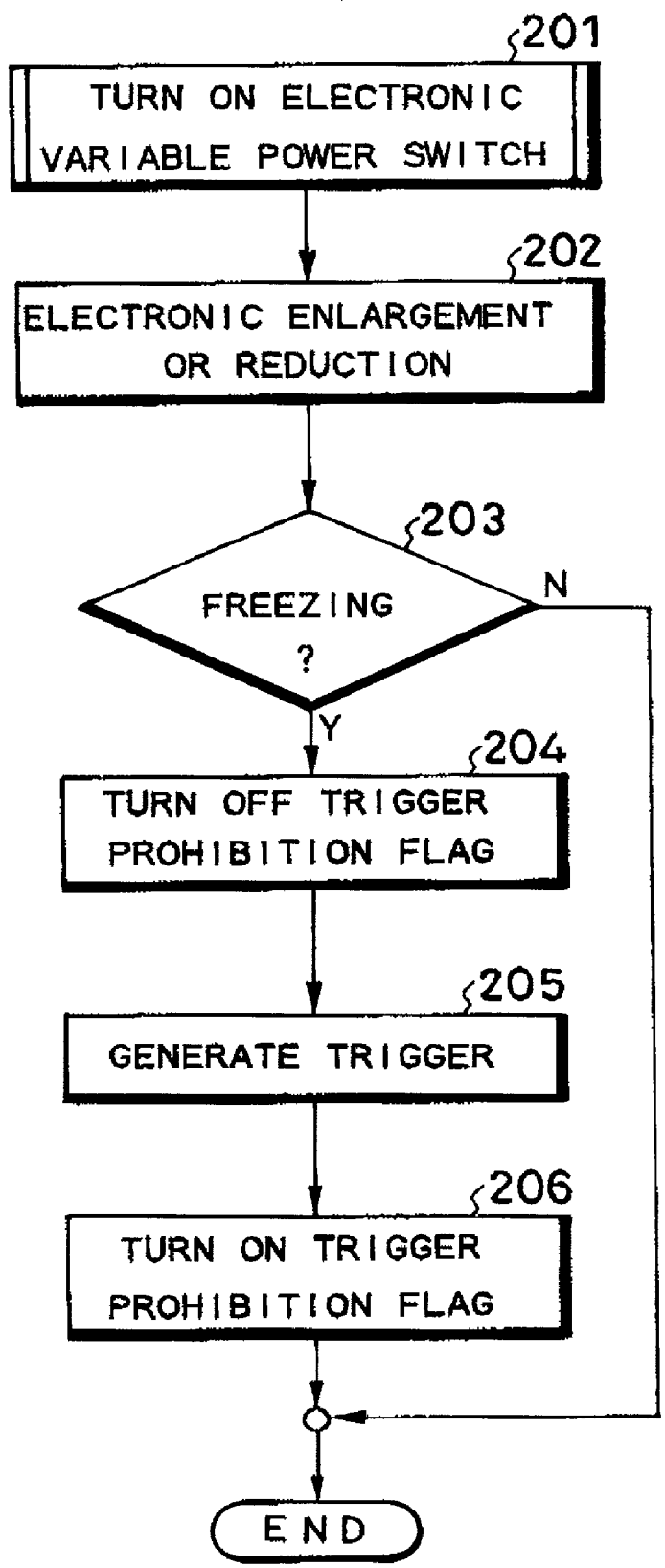

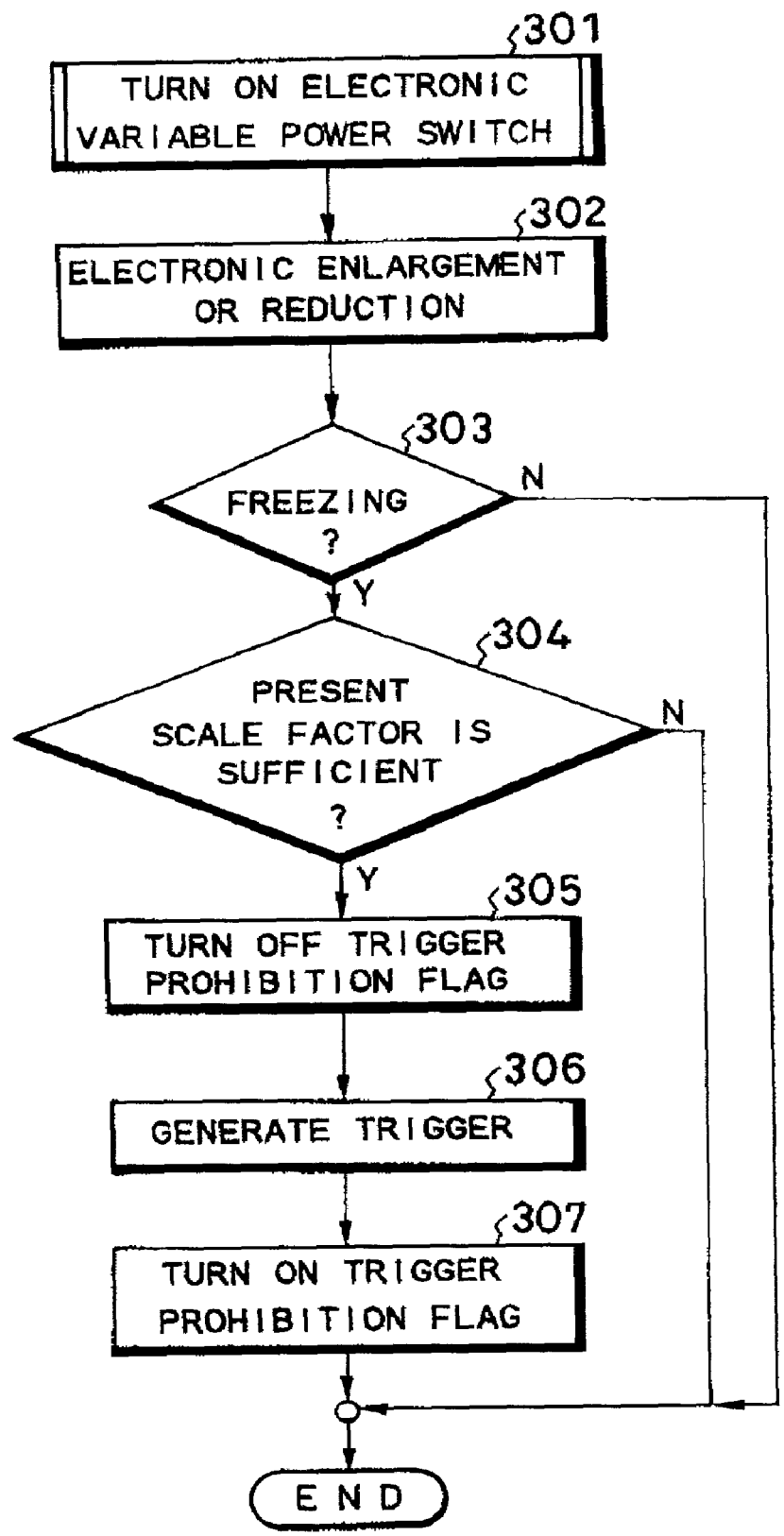

ELECTRONIC ENDOSCOPE APPARATUS ENLARGING A STILL IMAGE

BACKGROUND OF THE INVENTION

This application claims the priority of Japanese Patent Applications Nos. 2000-283072 filed on Sep. 19, 2000 and 2001-59780 filed on Mar. 5, 2001 which are incorporated herein by reference.

FIELD OF THE INVENTION

The present invention relates to an electronic endoscope apparatus, and in particular, to an endoscope apparatus that can enlarge and reduce an image, imaged with a solid-state image pickup device, by an electronic zoom function.

DESCRIPTION OF THE PRIOR ART

In an electronic endoscope apparatus, a CCD (Charge Coupled Device) that is a solid-state image pickup device is arranged at an end section, and this CCD images an object. After various kinds of processing are performed, an output signal from this CCD is made to be a video signal (animation) for outputting it to a monitor. However, it is also possible to form a still image by operating a freeze switch. Namely. a still image is formed by storing an image signal (video signal) in image memory when the freeze switch is turned on, and reading the video signal in this image memory. Hence, it becomes possible to output this still image to a monitor or various kinds of recording devices.

Moreover, since electronic endoscope apparatuses in recent years have each electronic variable power (electronic zoom) function. Hence, it becomes possible to observe the object, imaged with the above-described CCD, on a monitor by enlarging the object at a predetermined magnification, or to record an enlarged image in a recording device.

FIG. 10 shows a partial circuit within a processor apparatus in a conventional electronic endoscope apparatus. This processor apparatus comprises an electronic variable power circuit 1 that inputs a signal outputted from a CCD in an electronic endoscope side, and image memory 2 connected to the latter stage of this circuit, and these circuits are controlled by a microcomputer 3.

According to such structure, when an electronic variable power switch is operated, the microcomputer 3 outputs a variable power command signal to the electronic variable power circuit 1. Then, this electronic variable power circuit 1 performs the processing of an operating scale factor to the video signal inputted to store this video signal in the image memory 2. Usually, by reading the video signal in this memory 2 one by one, a moving image of object images is displayed on a monitor etc.

On the other hand, when the first operation (or a first stage) of the freeze switch is performed, the microcomputer 3 performs the control of forbidding data writing to the image memory 2 in predetermined timing, and repeatedly reading an image at the time of the freeze switch being pushed, In consequence, the still image is displayed on the monitor Moreover, when the second operation (or a second stage) of the above-described freeze switch is performed, a record trigger signal is outputted to a recording device, and hence the still image is recorded in the recording device such as a copying machine owing to this.

However, the above-described electronic endoscope apparatus has a problem that, if it is desired to observe an image, once frozen with the freeze switch, by enlarging the image or to record the image on a recording device, one more freeze operation is necessary after canceling the freezing and enlarging the image. Thus, as understood with FIG. 10, since the electronic variable power circuit 1 is provided in a preceding stage of the image memory 2 which stores a still image signal, electronic variable power operation cannot be performed after the freeze. Therefore, when a still image at a different magnification is required, it needs one more cycle of operation, and hence it needs the time and effort of the operation.

On the other hand, it is better in many cases to perform the search and positioning in a state where an overview can be performed rather than enlarging and searching the part at a small viewing angle in order to observe the object, which is a desired part, in optimal conditions. On the other hand, there is a request of wanting to take a still image enlarged as an image for performing the observation and diagnosis in detail and to leave this image as a recorded image.

The present invention is made in view of the above-described problems. Its object is to provide an electronic endoscope apparatus that can easily form an image at a desired magnification, can obtain a still image itself, positioned in optimum conditions, in a state where the still image is arbitrarily enlarged, and moreover, can record the still image, which is enlarged, in a recording device through easy operation.

SUMMARY OF THE INVENTION

In order to achieve the above-described object, the present invention comprises: an image signal processing circuit which forms an image signal of an object by an output signal of an image pickup device; image memory which stores a still image signal at the time of a still image forming operation; an electronic variable power circuit which forms a still image, electrically enlarged, on the basis of a signal in this image memory; and a control circuit which performs the control of the image memory, and the control of outputting the still image, obtained in the above-described electronic variable power circuit, to a display unit and a recording unit.

The above-described control circuit can perform such control that the still image signal is stored into the above-described image memory by the first operation of a freeze switch (with a function of judging the count of operation) or a first-stage operation of a two-stage operation switch, the above-described electronic variable power circuit executes variable power processing by the operation of an electronic variable power switch, and a still image signal, which is given the above-described variable power processing, is outputted to a recording device by performing a second operation or a second-stage operation of the above-described freeze switch.

According to the above-described structure, for example, a video signal at that time is stored in the image memory by turning on the first stage of the freeze switch. When the electronic variable power switch is operated in this state, it becomes possible to form a still image, electronically enlarged, on the basis of a signal in the image memory. Then, when the second stage of the freeze switch is turned on, a trigger for image recording is outputted. Owing to this, the still image is recorded in a recording device such as a copying machine, a printer, and a filing system. In addition, a video signal (a moving image or a still image) in the above-described image memory is always outputted to a monitor that is a display unit and is displayed on it.

Moreover, the above-described control circuit can store a still-image signal in the above-described image memory by the operation of the freeze switch, can perform variable power processing by the above-described electronic variable power circuit through the operation of the electronic variable power switch, and can record the still image signal, which is given the variable power processing, in a recording device. Thus, when the electronic variable power switch is operated after storing a still-image signal in the image memory by freeze switch operation, for example, image enlargement is performed while the enlarged still-image signal is automatically outputted to and is recorded in a recording device. In this case, before recording a still image in a recording device, it is preferable to make it confirmed with a confirmation message whether a present magnification is sufficient.

Moreover, another form of the present invention is characterized in comprising: an image signal processing circuit which forms a still image signal of an object from an output signal of an image pickup device on the basis of still image forming operation; image memory which stores the still-image signal outputted from this image signal processing circuit; an electronic variable power circuit which reads the still image signal in the above-described image memory on the basis of the operation of the electronic variable power switch and forms the still image signal which is electronically enlarged; and a control circuit that performs such control that a record trigger signal for recording the above-described still image signal in a recording device is made to be generated when a recording operation switch is operated, the generation of this record trigger signal is prohibited after this generation, the generation of the above-described record trigger signal is made to be ready when the above-described electronic variable power switch is operated, and an enlarged still image is recorded in the above-described recording device when the above-described record trigger signal is generated on the basis of the operation of the above-described recording operation switch. In addition, the above-described recording operation switch is a freeze switch or a switch for recording that is replaced for this.

According to such structure, as mentioned above, for example, a still image formed by the first operation of the freeze switch is displayed on a monitor, and when the second operation of the freeze switch is performed, this still image is recorded in a recording device by outputting a recording trigger. Then, even if the third operation of the freeze switch is performed during the formation processing of a still image in this case, this apparatus is controlled so that a record trigger signal is not outputted without depending on the third or more operation of the freeze switch. The recording of still images duplicated is prevented owing to this.

However, when the electronic variable power switch is operated during this freeze operation, a still image electronically enlarged is formed on the basis of a signal in the above-described image memory, and the apparatus is set in a state in which an output of the above-described record trigger signal is enabled. Hence a record trigger signal is outputted by the third operation or the like of the freeze switch after the operation of the electronic variable power switch. Owing to this, the still image enlarged can be recorded in a recording device.

BRIEF DESCRIPTION OF THE DRAWINGS

FIG. 1 is a circuit block diagram showing the structure of an electronic endoscope apparatus according to an embodiment of the present invention;

FIG. 5A is a flow chart showing freeze operation in a microcomputer of the first embodiment;

FIG. 5B is a flow chart showing the recording operation of a still image in the microcomputer of the first embodiment;

FIG. 6 is a flow chart showing the recording operation of a still image in a microcomputer of a second embodiment;

FIG. 7 is a flow chart showing the recording operation of a still image in a microcomputer of a third embodiment;

DETAILED DESCRIPTION OF THE PREFERRED EMBODIMENTS

Figure 2A:
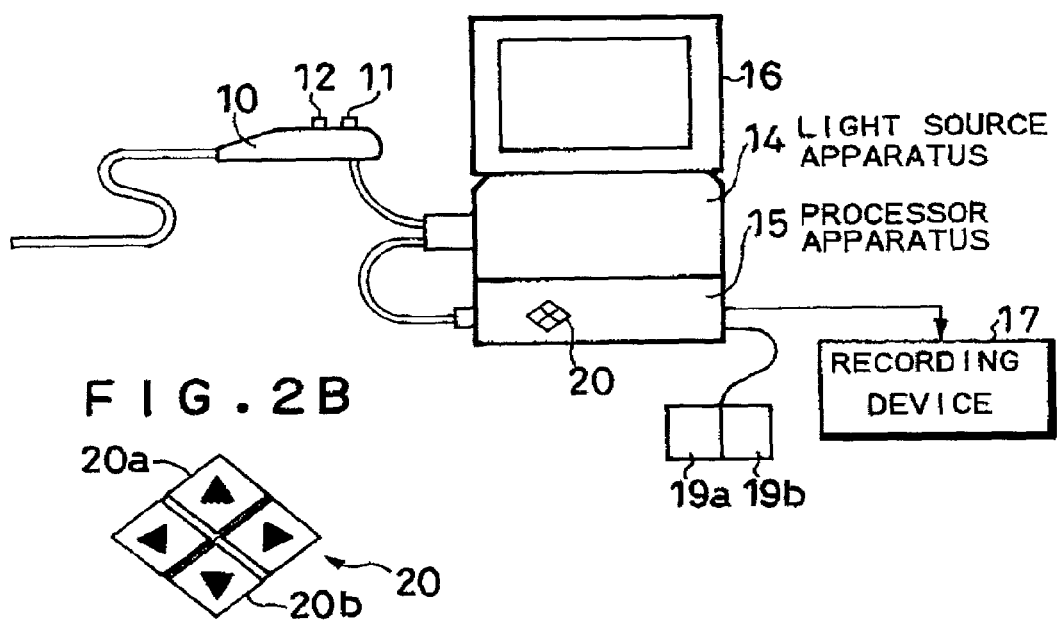
FIG. 2A is a schematic diagram showing the whole structure of the electronic endoscope apparatus according to the embodiment.

FIGS. 1 and 2 show the structure of an electronic endoscope apparatus according to an embodiment. As shown in FIG. 2, a freeze switch 11 and an electronic variable power (electronic zoom) switch 12 are arranged in an electronic endoscope 10. This electronic endoscope 10 is connected to a light source apparatus 14 and a processor apparatus 15 through cables A monitor 16, and a recording device 17 such as a copying machine, a printer, a filing apparatus, and a VTR are connected to this processor apparatus 15.

Moreover, foot switches 19a and 19b which can be also used as electronic variable power switches are provided in this processor apparatus 15, and in a control panel, an operation key 20 having UP, DOWN, LEFT, and RIGHT keys for various setup and operation containing an electronic variable power function is arranged.

FIG. 1 shows internal circuits of the above-described electronic endoscope 10 and processor apparatus 15. As shown in FIG. 1, a CCD 24 arranged at the end section and a timing generator (TG) 25 which gives a driving signal to this CCD 24 are provided in the electronic endoscope 10. Moreover, a CDS (correlation double sampling)/AGC (automatic gain control) circuit 26 which inputs the output signal, an A/D converter 27, and a DVP 28 (digital video processor) which performs various kinds of image processing such as a gamma processing for a digital video signal outputted from this A/D converter 27 are connected to the above-described CCD 24.

Furthermore, a microcomputer 30 that inputs operation signals of the above-described freeze switch 11 and electronic variable power switch 12, and performs various kinds of control is provided. If a two-stage operation type switch is used as the above-described freeze switch 11, the above-described microcomputer 30 outputs a freeze operation control signal by a first-stage operation (half-push operation) of this switch 11. The above-described microcomputer 30 outputs a record trigger signal to a recording device 17 by a second-stage operation of the switch 11 (additional push operation). As this freeze switch 11, if a two-step operation type switch (a switch of distinguishing the first operation from the second operation performed during freeze) that discriminates between the first operation and second operation is used, the microcomputer 30 outputs a freeze operation control signal by the first operation and outputs a record trigger signal by the second operation.

Figure 3A:
FIGS. 3A and 3B are explanatory diagrams showing a pattern of an enlarged image set in the embodiment.
Figure 3B:
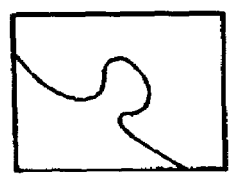

Moreover, by using a single operation switch as the above-described electronic variable power switch 12, the microcomputer 30 (or 36 as described below), for example, as shown in FIGS. 3A and 3B, can perform such control that either of 1× or 2× magnification (or, either of 1×, 2×, or 3× magnification) can be selected alternately (or cyclically).

In FIG. 1, image memory 32 which inputs the output signal of the above-described DVP 28 is provided in the processor apparatus 15, and an electronic variable power circuit 33 is connected to the latter part of this image memory 32. In this electronic variable power circuit 33, a character generator 34, which generates characters, which are added to an image, such as a letter and a figure, and a D/A converter 35, are provided. An output of this D/A converter 35 is supplied to a monitor or various kinds of recording devices 17.

Moreover, also in this processor apparatus 15, a microcomputer 36 that performs various kinds of control is provided. This microcomputer 36 performs the control of the electronic variable power, the transmission of the record trigger signal to the recording device 17, etc. Thus, the operation signal of the electronic variable power switch 12 in the above-described electronic endoscope 10 is supplied to the microcomputer 36 through the microcomputer 30. Hence the microcomputer 36 makes the electronic variable power circuits 33 operate owing to this to form a twice-enlarged image.

Figure 2B:
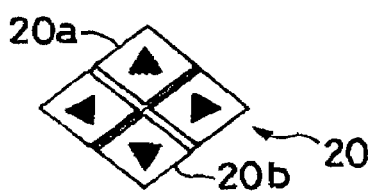
FIG. 2B is a schematic diagram showing the structure of operation keys shown in FIG. 2A.
Figure 4A:
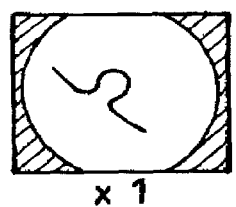
FIGS. 4A, 4B, and 4C are explanatory diagrams showing another pattern of enlarged images set in the embodiment.
Figure 4B:
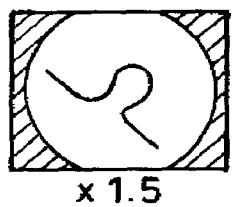
Figure 4C:
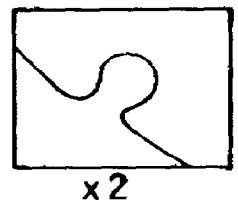

Furthermore, in the example concerned, the electronic variable power operation can be performed by the foot switch 19 in FIG. 2A, or the operation key 20 in FIG. 2B. Thus, if the foot switches 19a and 19b are made to become electronic variable power switches, as shown in FIGS. 4A, 4B, and 4C, it becomes possible to perform operation with the switch 19a in the enlargement direction like 1×→1.5× →2×, and so on, and with the switch 19b in the reduction direction that is the opposite direction. On the other hand, if the operation key 20 is made to become the electronic variable power switch, it becomes possible to perform operation, for example, with the UP operation key 20a in the enlargement direction, and with the DOWN operation key 20b in the reduction direction like 2×→1.5×→1×, and so on.

An embodiment has the above structure, and next, the operation of the first embodiment will be described with referring to FIGS. 5 and 6. First, an imaging signal of an object that is outputted from the CCD 24 of the electronic endoscope 10 is given sampling and enlargement processing by the CDS/AGC circuit 26. In the DVP 28, a video signal digitized by A/D converter 27 is given predetermined image processing to be supplied to the processor apparatus 15. In this processor apparatus 15, the video signal is supplied to a monitor through the image memory 32 (or without passing through this image memory 32), electronic variable power circuit 33, and character generator 34, and D/A converter 35. Thereby, a moving image of the object is displayed on the monitor.

On the other hand, a still image is formed by operating the freeze switch 11. As shown in Step 101 in FIG. 5A, when a first stage switch is turned ON by the half-push of the freeze switch 11, it is judged whether the process is under freeze (operation) at the following Step 102 now. If being "N (NO)", the freeze operation is executed at Step 103. Namely, image data stored at the time of the freeze operation is read repeatedly by forbidding the writing to the image memory 32, and a still image of the object is displayed on the monitor 16. Then, when a trigger prohibition flag is turned OFF at Step 104, the state becomes a standby state for recording operation.

When the electronic variable power switch 12 is pushed in the half-push state of the above-described freeze switch 11, the electronic variable power circuit 33 operates by the microcomputers 30 and 36 to form an enlarged image signal on the basis of a video signal read from the image memory 32. For example, a twice-enlarged still image as shown in FIG. 3A is displayed on the monitor 16. Here, as shown in Step 111 in FIG. 5B, when the second stage of switch is turned ON by further pushing of the freeze switch 11, it is judged whether the process is under freeze at Step 112 now. If being "Y (YES)", it is judged whether the trigger prohibition flag is turned on at Step 113.

Since the trigger prohibition flag is made off at the above Step 104 at this time, the judgment result at Step 113 becomes "N". A record trigger signal is generated at Step 114, and the trigger prohibition flag is returned to ON at Step 115. In this manner, when the record trigger signal is outputted to the recording device 17 by the microcomputers 30 and 36, an enlarged still image is recorded with the output signal of the D/A converter 35 in the recording device 17 such as a copying machine.

An enlarged still image is recorded as described above. When searching a particular part of an object, or a predetermined state of the part on a monitor in the example concerned, an endoscope can be operated by looking at a comparatively wide range with an image having a large angle of visibility that is not enlarged. On the other hand, when a particular part or a predetermined state can be confirmed with a still image, the enlarged still image can be easily displayed and recorded.

In the first embodiment, the foot switches 19a and 19b or operation keys 20a and 20b can be used instead of the above-described electronic variable power switch 12. In this case, as shown in FIGS. 4A to 4C, it is possible to set a magnification at a desired value with the switches 19a and 19b or operation keys 20a and 20b, to display this arbitrary enlarged still image on the monitor 16, and to record the image in the recording device 17. In addition, although the freeze switch 11 is two-stage type in the above description, a two-step operation type switch (a switch of judging the count of operation) can also perform the freeze and recording operation similarly.

FIG. 6 shows the operation of a second embodiment on still image recording. This second embodiment also outputs a record trigger signal at the time of the operation of an electronic variable power switch. That is, the microcomputer 36 performs electronic enlargement or reduction at Step 202 at the time of turning on the electronic variable power switch 12 (or 19a, 19b, 20a, and 20b) at Step 201. The microcomputer 36 judges whether the process is under freeze (by the operation of the freeze switch 11) now in the next Step 203. If being Y, the microcomputer 36 turns off a trigger prohibition flag at Step 204 to make a record trigger signal generated at the next Step 205. Furthermore, the microcomputer 36 performs control so as to restore the trigger prohibition flag to ON at the next Step 206.

According to this, the still image is electrically enlarged and recorded in the recording device 17 at the same time by one operation of the electronic variable power switch 12.

Hence the second-stage operation or the second operation for generating the record trigger signal by the freeze switch 11 becomes unnecessary. Moreover, still images recorded with the electronic variable power switch 12 can include not only an enlarged image, but also, for example, a still image that is not enlarged, that is, both of 1× and 2× images. Alternatively, it may be also performed to record images having the predetermined count (for example, FIGS. 4A to 4C) of magnifications that are defined as a set.

FIG. 7 shows the operation of a third embodiment on still image recording. This third embodiment is an example of asking an image-shooter's confirmation before outputting a record trigger signal with an electronic variable power switch. That is, although operation from Step 301 to Step 303 is the same as that of the above-described second embodiment shown in FIG. 5, it is judged at the next Step 304 whether a present magnification is sufficient. As for this judgment, such a message including "Is the present magnification sufficient?" is displayed, for example, on the monitor 16 by using the character generator 34 Then, when OK is judged with any key operation such as a control panel (various kinds of approaches are considerable, for example, a method of regarding that it is an affirmative response when there is no key operation of cancellation within predetermined time), the process goes to the next Step 305.

Then, the trigger prohibition flag is turned off at this Step 305. A record trigger signal is generated at the next Step 306 to restore the trigger prohibition flag to ON at the next Step 307. This third example becomes effective in the structure that makes it possible to set up the magnification finely and arbitrarily with the foot switches 19a and 19b or the operation keys 20a and 20b in FIG. 2.

As described above, according to the first to third embodiments, it is possible to easily obtain a desired enlarged still image without performing freeze release and re-freeze. At the same time, it becomes possible to display or record a still image itself in optimum conditions which is obtained by the particular part search and positioning in predetermined conditions in the display having a large angle of visibility as an enlarged image.

Moreover, this embodiment has an advantage that an enlarged still image obtained by the operation with an electronic variable power switch is recordable in a recording device by a second-stage operation (or second operation) of a freeze switch. Furthermore, this embodiment has advantages that an enlarged still image can be formed by the single operation of the electronic variable power switch, can be simultaneously recorded in a recording device, and can be recorded by easy operation.

Next, a fourth embodiment will be described with referring to FIGS. 8 and 9. The structure of this fourth embodiment is the same as that of the embodiments in FIGS. 1, 2A, and 2B, and perform the variable power operation as shown in FIGS. 3A, 38, and 4A to 4C, but control by the microcomputer 36 is different. That is, in this fourth embodiment, if a still image is under formation, the continuous operation of a recording operation switch is allowed by turning off a trigger prohibition flag when an electronic variable power switch is operated. Owing to this, a still image with an arbitrary magnification can be easily recorded. In addition, the above-described two-operation type switch of judging the count of operation is used as the freeze switch 11 of this fourth embodiment.

Figure 8:
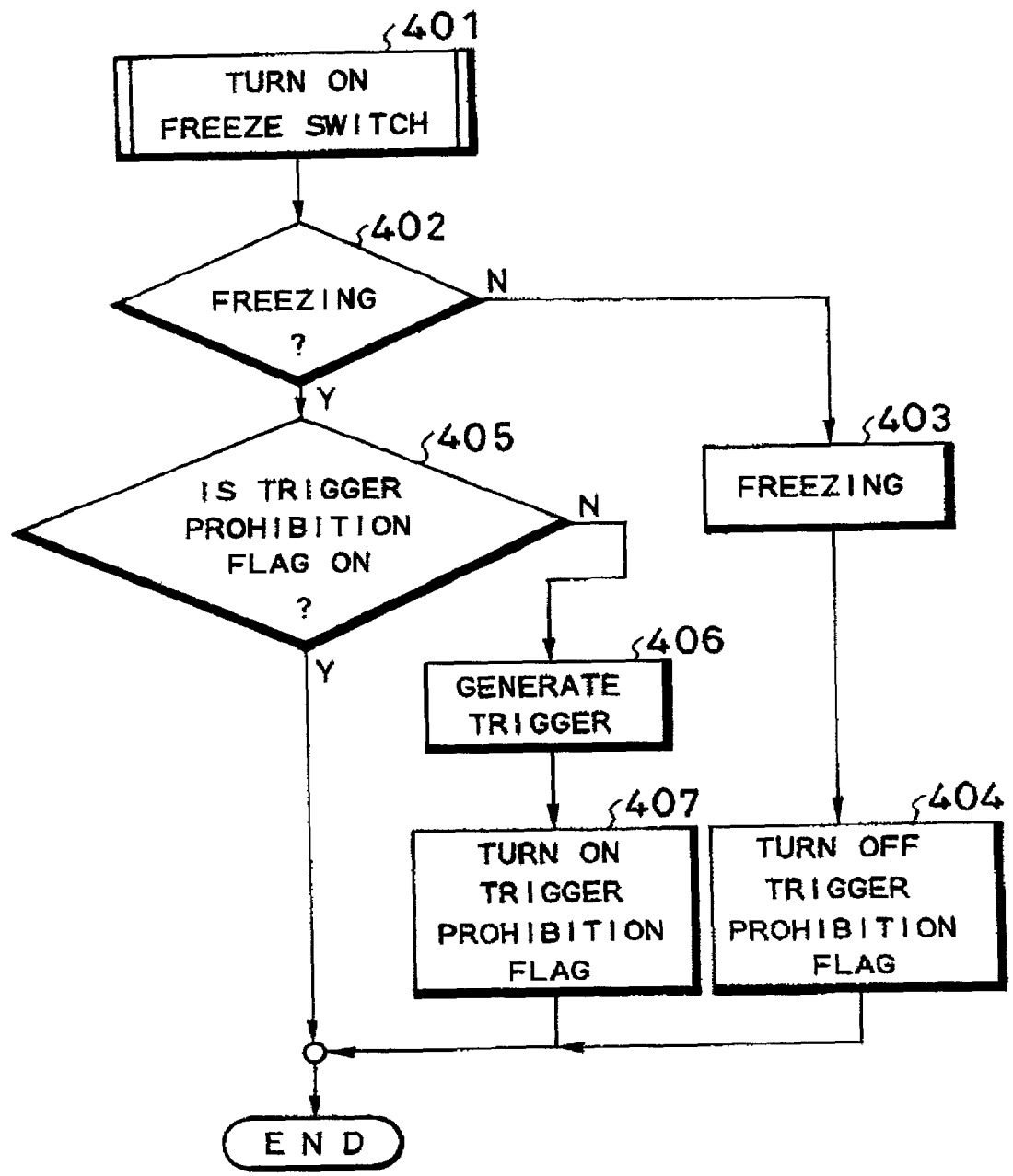
FIG. 8 is a flow chart showing the freeze operation and recording operation of a still image in a microcomputer of a fourth embodiment.

In FIG. 8, when the freeze switch 11 is turned on (first operation) as shown in Step 401, the microcomputer 36 judges at the next Step 402 whether the process is under freeze (operation) now. If being "N (NO)", the microcomputer 36 performs the freeze operation at Step 403. Namely, by forbidding the writing into the image memory 32, the image data stored at the time of the freeze operation is read repeatedly, and the still image of an object is displayed on the monitor 16. Then, at Step 404, the record trigger prohibition flag is turned off (OFF), and the process becomes a standby state for recording operation.

Here, when the above-described freeze switch 11 is pushed once again to be turned on (second operation) (Step 101), the process is under freeze at the above Step 402. Hence, the result becomes "Y (YES)", and the process goes to Step 405. Although it is judged at this Step 405 whether the trigger prohibition flag is ON, at this time, it is already turned off at the above Step 404, and hence the process goes to Step 406. The record trigger signal is generated at this Step 406, and the trigger prohibition flag is restored to ON at the next Step 407. When the above-described record trigger signal is supplied to the recording device 17 from the microcomputer 36, the still image under freeze (for example, a 1× magnification of still image that is not electronically enlarged) is recorded in the recording device 17 such as a copying machine by an output signal of the D/A converter 35. In addition, when a third operation of the freeze switch 11 is performed after this, the record trigger is not outputted since the trigger prohibition flag is turned on at Step 405, and hence duplicated records can be prevented.

Figure 9:
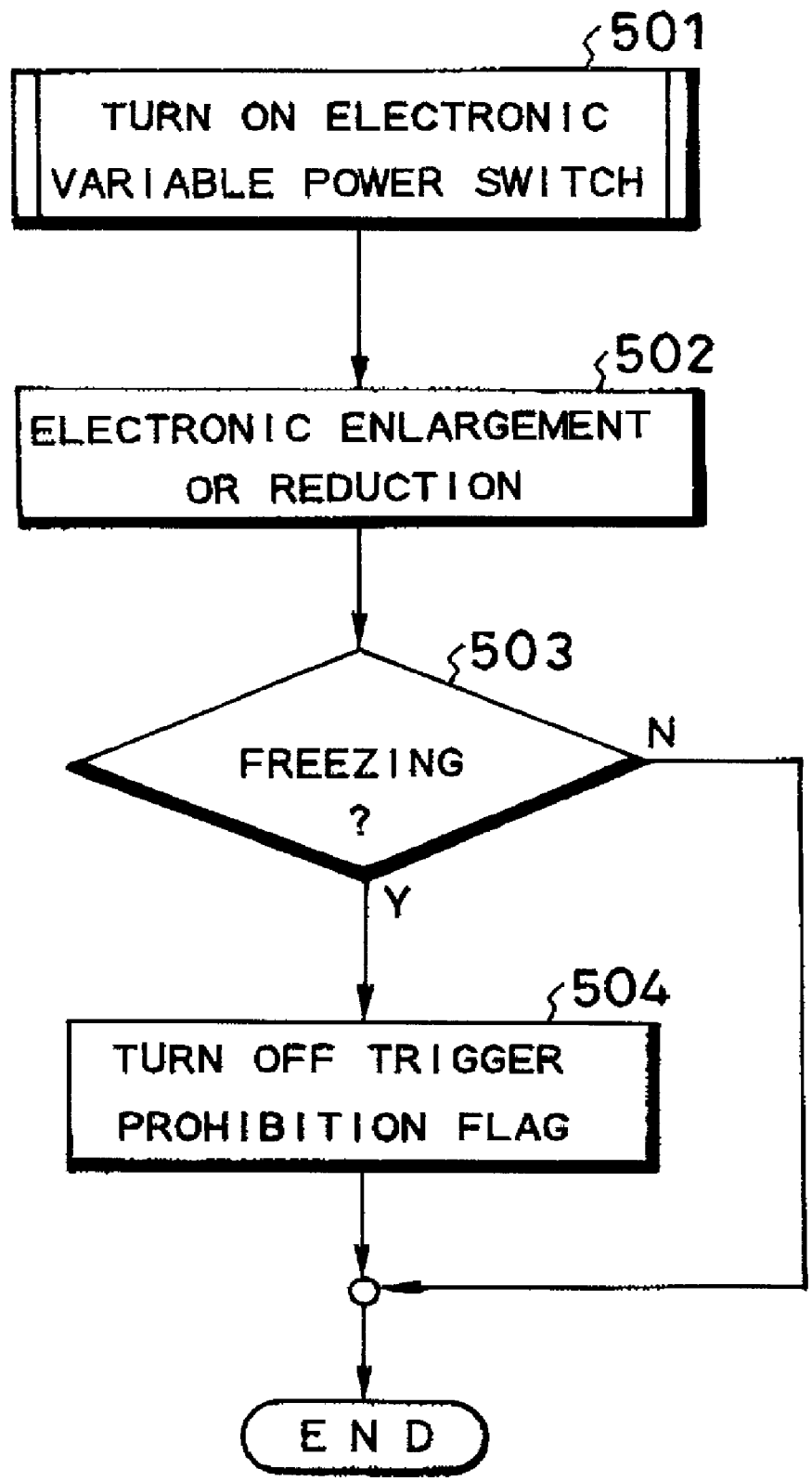
FIG. 9 is a flow chart showing electronic variable power operation in the microcomputer of the fourth embodiment.
Figure 10:
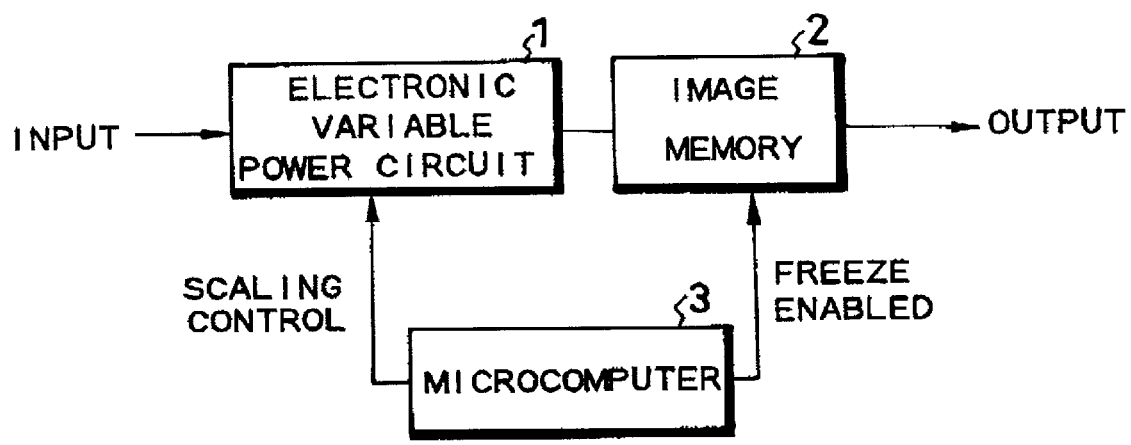
FIG. 10 is a block diagram showing circuits in the processor apparatus of a conventional electronic endoscope apparatus.

On the other hand, as shown in FIG. 9, when the above-described electronic variable power switch 12 (or 19 and 20) is operated (Step 501), electronic enlargement or reduction will be controlled at the next Step 502. In the electronic variable power circuit 33, on the basis of a video signal read from the image memory 32, for example, an enlarged image signal is formed. For example, a twice enlarged still image as shown in FIG. 3 (A2), or a 1.5× magnification of still image as shown in FIG. 3 (B2) is displayed on the monitor 16. Then, at next Step 503, the microcomputer 36 judges whether the process is under freeze now. If being "Y", the microcomputer 36 turns off the trigger prohibition flag at Step 504.

Then, when the above-described freeze switch 11 is pushed in this phase, the result becomes "N" at Step 405 in FIG. 8. Hence the record trigger signal is generated at the next Step 406, and therefore, owing to this, the above-described electronically enlarged image is recorded in the recording device 17.

Thus, whenever the electronic variable power operation is performed with the electronic variable power switch 12, the foot switch 19, or the operation key 20, the state becomes ready for generation of the record trigger signal Hence it becomes possible to record an image, enlarged to a desired magnification (or reduced), in the recording device 17. In addition, as described in FIG. 8, regardless of the electronic variable power, the trigger prohibition flag is turned off by the first operation of the freeze switch 11 (Step 404). Hence it is natural that a still image with a 1× magnification can be recorded in a recording device 17 with a record trigger when an electronic variable power function is not operating.

Although it is described in the fourth embodiment that the freeze switch 11 is a two-operation type switch, a two-stage type switch can be used as this freeze switch 11. Thus, a first stage of operation (half-push operation) makes the freeze operation, and a second-stage operation (additional pushing operation) makes the output of the record trigger signal. Also in this case, freeze and recording operation can be performed similarly. Moreover, it is also possible to output the above-described record trigger signal with another switch.

As described above, according to the fourth embodiment, it becomes possible to easily form an arbitrarily enlarged still image of an object positioned in optimum conditions which are obtained by the particular part search in the display having a large angle of visibility, and to record the enlarged still image in a recording device in simple operation.

What is claimed is:

1. An electronic endoscope apparatus comprising:

an image signal processing circuit which forms a still image signal of an object from an output signal of an image pickup device in response to a freeze switch;

an image memory which stores the still image signal outputted from this image signal processing circuit; an electronic variable power circuit which reads the still image signal in the image memory on the basis of operation of an electronic variable power switch and forms a still image signal which is electronically enlarged;

a control circuit which performs control of displaying the still image to a display unit by the freeze switch, wherein control of recording the still image in a recording device by the record trigger signal which occurs by the operation of a recording operation switch, wherein control of operating the electronic variable power circuit is based on the electronic variable power switch, wherein control of enlarging the still image which is stored to the image memory by the electronic variable power circuit and displaying this enlargement still image to the display unit when the electronic variable power switch is operated during the display of the still image;

wherein control is such that a record trigger signal, used for recording the enlargement still image in the recording device is made to be generated when the recording operation switch is operated during the display of the enlargement still image, generation of this record trigger signal is prohibited after this generation to then prevent repeated duplicated recording of the enlargement still images of the same magnification, and wherein control is such that generation of the record trigger signal is made to be ready when the electronic variable power switch is operated after the generation of the record trigger signal is prohibited and the new enlargement still image is recorded in the recording device when a record trigger signal is generated on the basis of operation of the recording operation switch.

2. An electronic endoscope according to claim 1:

wherein the control circuit which performs control of the image memory, and control of storing the still image signal into the image memory by a first-operation of a freeze switch and displaying the still image to a display unit, and control of enlarging the still image which is stored to the image memory by the electronic variable power circuit and displaying this enlargement still image to a display unit when an electronic variable power switch is operated during the display of the still image, and control of recording the enlargement still image in a recording device by a second-operation of the freeze switch.

3. An electronic endoscope according to claim 1:

wherein the control circuit which performs control of the image memory, and control of storing the still image signal into the image memory by turning on a first-stage of the freeze switch when a two-stage operation type switch is used as the freeze switch, and displaying the still image to a display unit, and control of enlarging the still image which is stored to the image memory by the electronic variable power circuit and displaying this enlargement still image to a display unit when an electronic variable power switch is operated during the display of the still image, and control of recording the enlargement still image in a recording device by a second-stage operation of the freeze switch.

4. An electronic endoscope apparatus according to claim 1:

wherein the control that a still image signal is stored in the image memory by operation of a freeze switch, the electronic variable power circuit performs variable power processing by operation of an electronic variable power switch, and a still image signal, which is given the variable power processing, is stored in the recording device; and wherein the control circuit performs such control that a confirmation message of whether a still image signal at a present magnification is sufficient is displayed when the electronic variable power switch is operated, and a still image signal is recorded in the recording device when the present magnification is acknowledged.

* * * * *